Dec. 29, 1953   R. L. HIGGINS   2,664,029
REMOTELY ADJUSTABLE REARVIEW MIRROR
Filed April 7, 1951   3 Sheets-Sheet 1
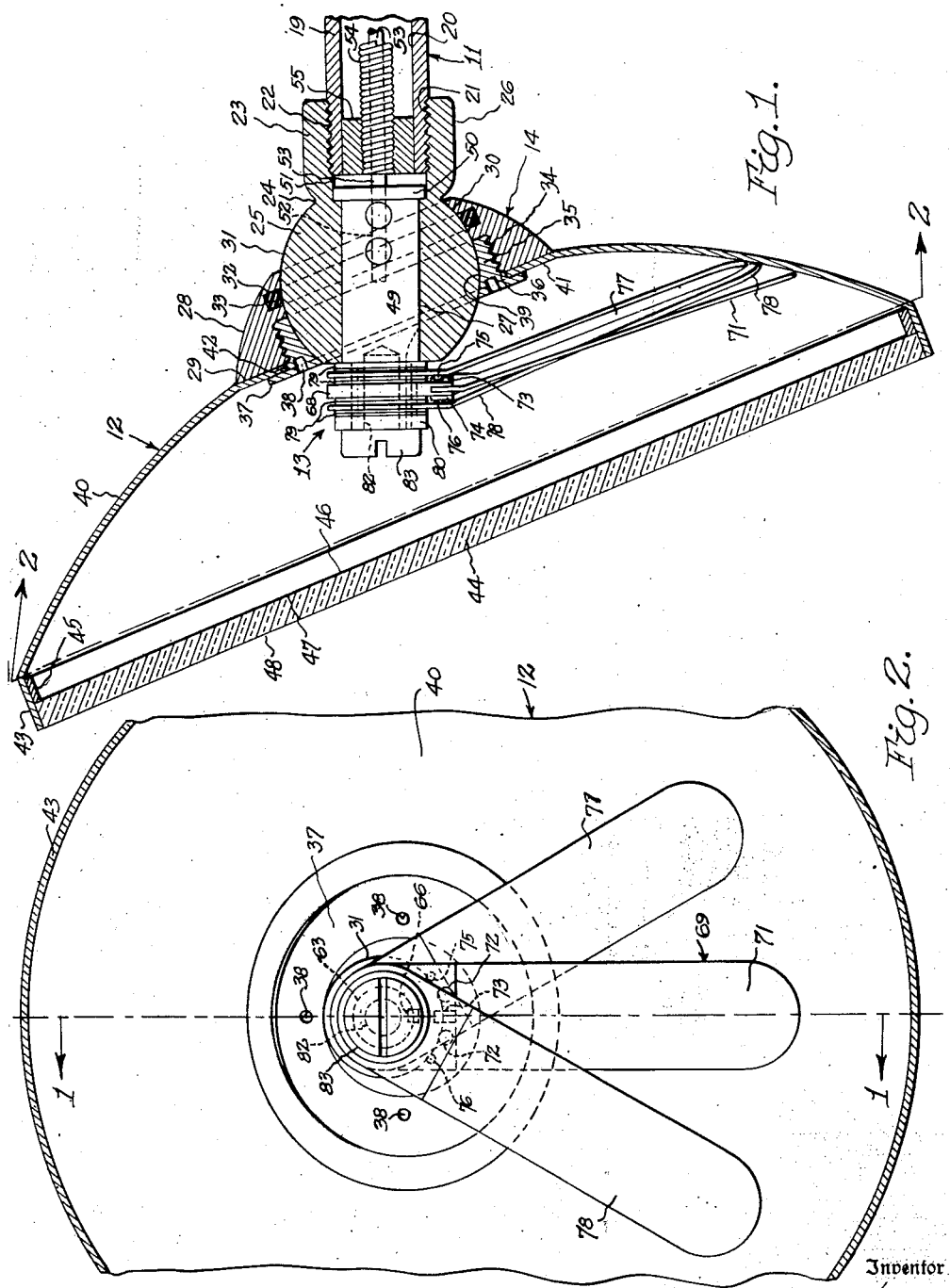
Inventor
Richard L. Higgins
Barthel + Bugbee
Attorneys Dec. 29, 1953   R. L. HIGGINS   2,664,029
REMOTELY ADJUSTABLE REARVIEW MIRROR
Filed April 7, 1951   3 Sheets-Sheet 2
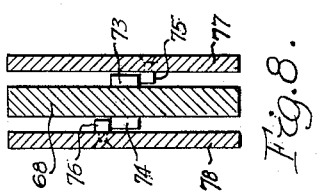
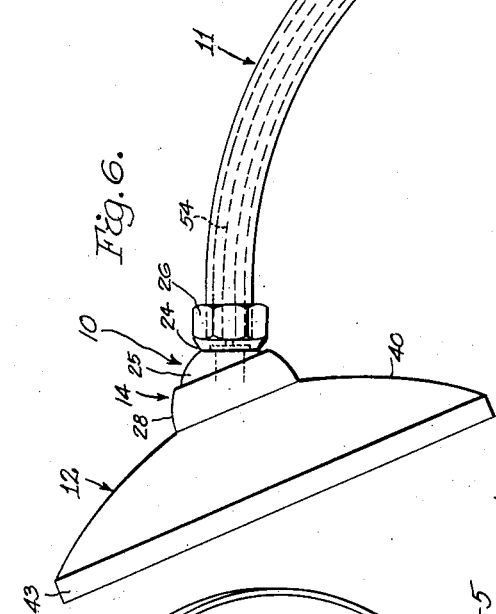
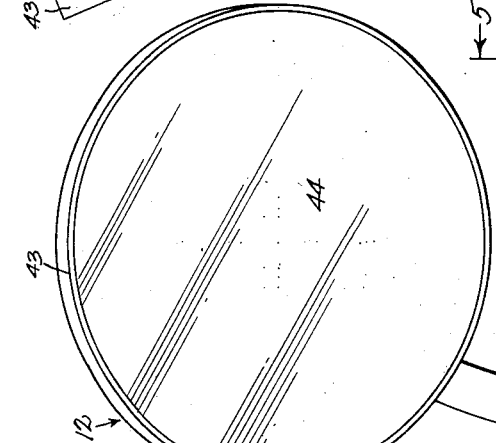
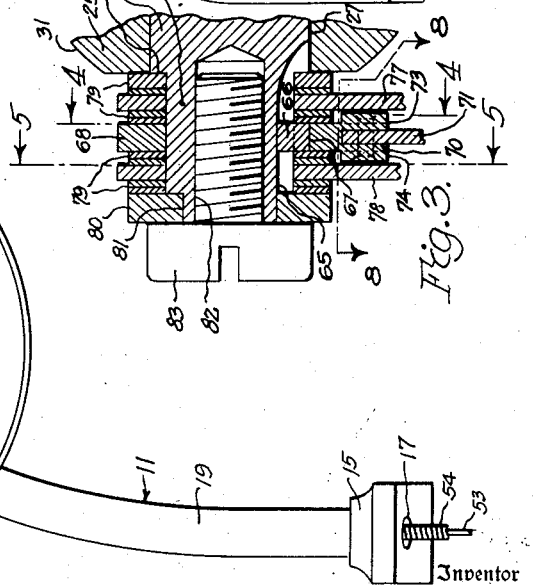
Inventor
Richard L. Higgins
Barthel & Bugbee
Attorneys

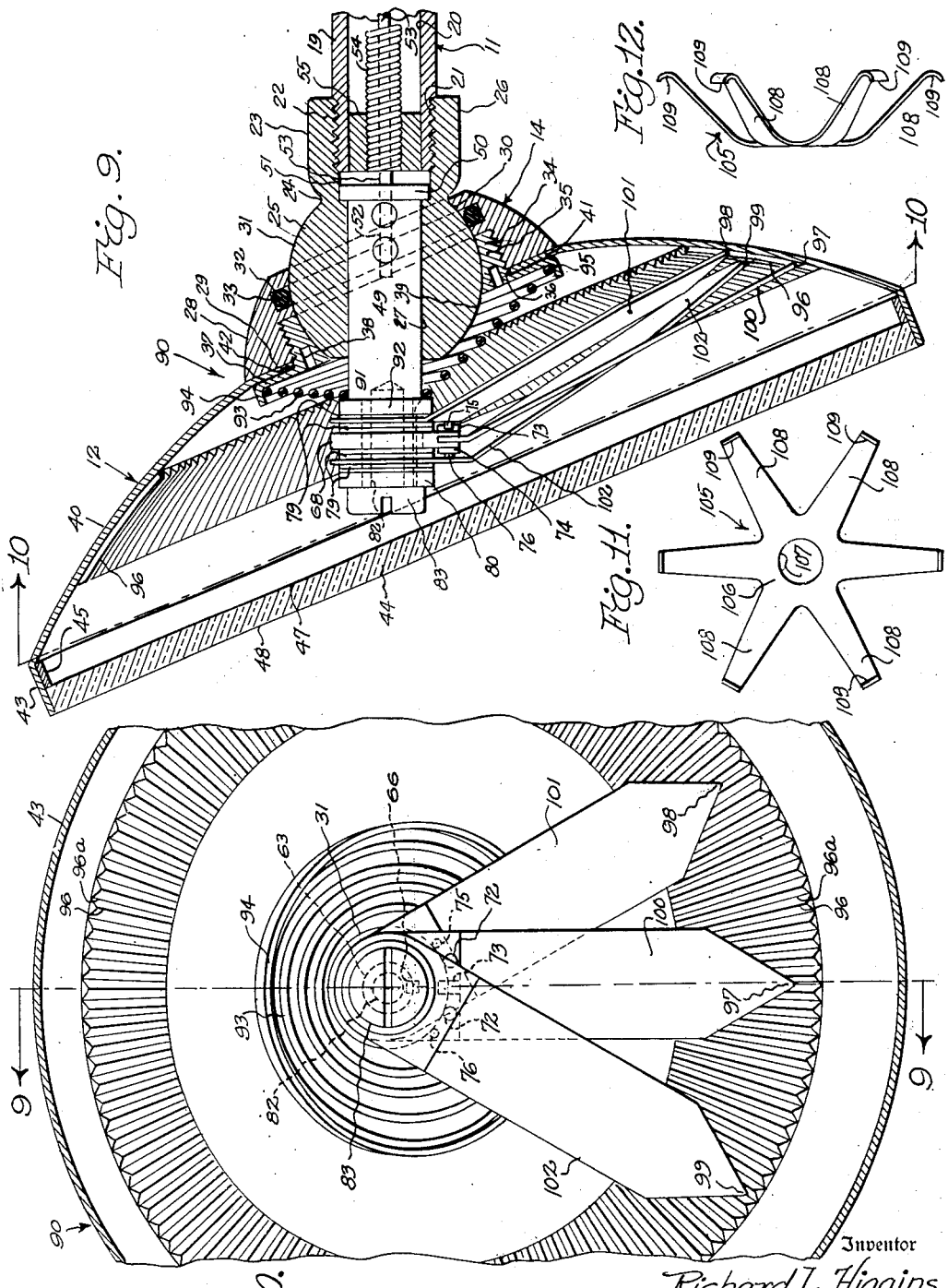

Patented Dec. 29, 1953

2,664,029

UNITED STATES PATENT OFFICE 2,664,029

REMOTELY ADJUSTABLE REARVIEW MIRROR

Richard L. Higgins, Detroit, Mich.

Application April 7, 1951, Serial No. 219,833

12 Claims. (Cl. 88—93)

This invention relates to vehicle rear view mirrors and, in particular, to adjustable rear view mirrors.

One object of this invention is to provide a remotely adjustable rear view mirror, the tilt of which can be remotely controlled by an adjustment which is within reach of the operator without leaving the driver's seat and without opening the vehicle window.

Another object is to provide a remotely adjustable rear view mirror of the foregoing character wherein the tilting of the mirror is accomplished by mechanism located immediately behind the mirror and operated by a flexible shaft or other motion-transmitting mechanism adjusted by a control knob or other control element within reach of the vehicle operator.

Another object is to provide a remotely adjustable rear view mirror of the foregoing character wherein the mirror support is mounted upon a bracket by means of a ball and socket joint and tilted relatively to the bracket by rotatable fingers which are moved to and fro by a flexible shaft extending through the bracket to a knob or other manual control element located within reach of the vehicle driver, such as, for example, on the dash or windshield post of the vehicle.

In the drawings:

Figure 1 is a central vertical section through the mirror head of a remotely adjustable rear view mirror, according to one form of the invention, taken along the line 1—1 in Figure 2;

Figure 2 is an inclined, approximately vertical section taken along the line 2—2 in Figure 1, showing the mirror-tilting fingers;

Figure 3 is an enlarged fragmentary central vertical section through the mirror-tilting finger mounting shown in side elevation in the central portion of Figure 1;

Figure 4 is a vertical cross-section taken along the line 4—4 in Figure 3;

Figure 5 is a vertical cross-section taken along the line 5—5 in Figure 3;

Figure 6 is a top plan view of a remotely adjustable rear view mirror, the mirror head of which is shown in Figure 1;

Figure 7 is an elevational view of the mirror shown in Figure 6;

Figure 8 is a longitudinal section taken along the line 8—8 in Figure 3;

Figure 9 is a central vertical section through the mirror head of a modified adjustable rear view mirror, taken along the line 9—9 in Figure 10;

Figure 10 is an inclined approximately vertical section taken along the line 10—10 in Figure 9, showing the modified mirror-tilting mechanism;

Figure 11 is a front elevation in reduced size of a spring adapted to be used in a further modification of the mirror head shown in Figure 9; and Figure 12 is a side elevation of the spring shown in Figure 11.

Vehicle rear view mirrors as hitherto made have ordinarily been mounted inside the vehicle within reach of the operator or on a bracket outside the vehicle window beyond the reach of the operator when the window is closed. The rear view mirrors placed outside the vehicle give a far better view of the road than those placed inside the vehicle, but are difficult to adjust, particularly when the vehicle is in motion and the window is closed. Nevertheless, changes in road and traffic conditions often make it advisable to alter the tilt of the mirror so as to view a different sector of the road, and the ordinary externally-mounted rear view mirror provides no means for doing so. The present invention provides an externally mounted rear view mirror, the tilt of which may be adjusted from a location remote from the mirror, such as by a knob located inside the cab or on the dash or steering post of the vehicle.

Referring to the drawings in detail, Figures 6 and 7 show a remotely-adjustable rear view mirror, generally designated 10, according to one form of the invention as consisting generally of a bracket 11, a mirror head 12 and a mirror head tilting mechanism 13 for tilting the mirror head 12 upon a ball-and-socket joint 14 by which it is connected to the bracket 11.

The bracket 11 consists of a base 15 having a rear surface 16 configured to fit the body portion of the vehicle upon which the bracket 11 is to be mounted. The base 15 has a bore 17 (Figure 6) through it and a counterbore or countersunk portion 18 forming a socket for the inner end of the arcuate tubular arm 19 which supports the ball-and-socket joint 14 carrying the mirror head 12. The tubular arm 19 has a bore 20 through its interior from one end to the other. The outer end of the tubular arm 19 is externally threaded as at 21 to receive the internally-threaded bore 22 (Figure 1) of the tubular shank 23 of the ball element 24. The ball element 24 terminates in the ball portion 25 of the ball-and-socket joint 14 and the shank 23 is preferably provided with a hexagonal or other polygonal external surface 26 (Figure 6) for receiving a wrench. The ball 25 is provided with a longitudinal bore 27 communicating with the internally-threaded bore 22.

The ball-and-socket joint 14 has an annular socket element 28 with a front surface 29 (Figure 1), the socket element 28 having an internal partially spherical surface 30 fitting the external spherical surface 31 of the ball portion 25. In order to prevent entry of moisture, the socket element 28 is provided with an internal annular groove 32 in which is seated an annular sealing ring 33 of circular cross-section made from elastic deformable material, such as rubber, synthetic rubber, resilient synthetic plastic or the like. The socket element 28 is also provided with an internally-threaded bore 34 into which is threaded an annular nut or retaining ring 35 having an externally-threaded portion 36 thereon, and carrying an external flange 37. The threaded retaining ring 35 is provided with recesses 38 for receiving the pins of a conventional spanner (not shown) by which the retaining ring 35 may be threaded into the threaded bore 34. Optionally, of course, the rim of the flange 37 could be made of polygonal shape, for example hexagonal, to receive a conventional wrench. The threaded retaining ring 35, like the annular socket element 28, has an internal partially spherical surface 39 fitting the ball portion 25.

The mirror head 12 has a shell-like hollow casing 40 of arcuate cross-section with a central annular flat portion 41 secured to and fitting the front surface 29 of the annular socket element 28, and has an aperture 42 for the passage of the threaded retaining ring 35. The outer edge of the mirror head casing 40 is provided with an annular cylindrical flange 43 (Figure 1) in which a mirror 44 is mounted, with the optional use of a spacing ring 45. The mirror 44 is provided with a reflecting coating 46 of any suitable metal, such as nickel, silver, chromium, aluminum or the like, and may have either flat surfaces 47 and 48 or convex surfaces, as desired.

The mirror head tilting mechanism 13 by which the mirror head 12 is tilted on the ball-and-socket joint 14 includes a stem or shaft 49 (Figures 1 and 3) which is rotatably mounted in the bore 27 of the ball portion 25 and has a flanged head 50 retaining it in the unthreaded portion 51 of the threaded bore 22. The shaft 49 is provided with a recess 62 within which is secured the forward end of a conventional flexible wire 53 which passes through a spirally wound tubular housing or casing 54 mounted in a centrally-bored plug 55 secured in the forward end of the bore 20 of the bracket arm 19 (Figure 1). The spirally wound casing 54 containing the flexible wire 43 passes through the bore 20 of the arcuate bracket arm 19 and through the bore 17 of the base 15. The casing 54 at its inner end is secured to a tubular screw 56, the shank of which passes through a hole in the dash 58 or other portion of the automobile adjacent the driver, and is held in place by a threaded retaining ring or nut 59 threaded on the screw 56 on the opposite side of the dash 58. The flexible wire 53 passes through the tubular screw 56 and is secured in a recess 60 in a knob 61 by a set screw 62 or by other means. Thus, by turning the knob 61, the operator rotates the flexible wire 53 and the shaft or stem 49 in the bore 27 of the ball portion 25 of the ball-and-socket joint 14.

The shaft or stem 49 is provided with a reduced diameter portion 63 providing an annular abutment shoulder 64, and is also provided with a longitudinal keyway 65 (Figure 3) in which is mounted a short key 66. The key 66 at 67 drivingly engages the hub 68 of an operating blade 69 bored to receive the reduced diameter portion 63 of the shaft 49 (Figure 4). The hub 68 is slotted as at 70 to receive a blade portion 71 of flexible or spring material, such as spring steel, held in place by any suitable means, such as rivets 72. Projecting in opposite directions from the hub 68 is a pair of stops or bosses 73 and 74. The stops 73 and 74 engage inwardly facing pins 75 and 76 respectively on inner and outer arms or blades 77 and 78 which are bored to be loosely mounted upon the reduced diameter portion 63 of the shaft 49. The blades 77 and 78 and the hub 68 of the blade 69 are spaced apart from one another by washers 79. The washers 79 are held in place between the annular abutment 64 (Figure 3) and the end of the shaft 49 by a washer 80 bored to receive the further reduced diameter portion 81 of the end of the shaft 49 which is drilled and threaded as at 82 to receive a retaining screw 83.

The pins 75 and 76 engage opposite sides of the stops or bosses 73 and 74 (Figure 8) so that when the blade 69 is moved in one direction, it carries with it the blade 77 and when it is moved in the opposite direction, it carries with it the blade 78. The blades or arms 69, 77 and 78 are so spaced relatively to one another that they freely pass one another except for their interconnection through the pins 75, 76 and stops 73, 74. The blades 77, 69 and 78 are of slightly different lengths, the blade 77 being slightly shorter and the blade 78 slightly longer than the blade 69 (Figure 2), so that their ends engage slightly different contact circles on the inner wall of the shell or mirror head 40.

In the operation of the invention, let it be assumed that the base 15 of the bracket 11 has been firmly secured to a body portion or pillar of the vehicle, which has been suitably drilled for the passage of the flexible wire 53 and its casing 54, and that the inner ends of these elements are arranged as shown in the lower portion of Figure 6. Let it also be assumed that the inner and outer blades 77 and 78 are in the same relative positions to the middle or driving blade 69, as shown in Figure 2. If, now, the operator rotates the knob 61 to swing the middle blade 69 to the right (Figure 2), the stop 73 engages the pin 75 on the inner blade 77 and swings it to the right, tilting the mirror head 12 and consequently the mirror 44 to the right. If, on the other hand, the middle blade 69 is swung to the opposite direction, namely to the left, the stop 74 engages the pin 76 and swings the outer blade 78 to the left, tilting the mirror head 12 to the left. In this manner, the mirror head 12 may be tilted to and fro, as desired, merely by manipulating the loose inner and outer blades 77 and 78 by means of the driven blade 69. In order to change the mirror head 12 back to its central position, the knob 61 may be rotated an entire revolution, consequently rotating the shaft 49 an entire revolution, so that the stops 73 and 74 pick up the pins 75 and 76 of the inner and outer blades 77 and 78 and carry them back to their approximate positions shown in Figure 2.

The modified remotely adjustable rear view mirror head, generally designated 90 (Figures 9 and 10) is generally similar to the form of the invention shown in Figures 1 and 2 and similar parts are designated with similar numerals. In the modified mirror head 90, the shaft or stem 49 has been elongated as at 91 and provided with an enlargement 92 which is spaced away from the flattened forward end of the ball portion 25 so that on its forward surface, the enlargement 92 serves as an annular abutment for the rearmost washer 79. The rearward surface of the enlargement 92 serves as an annular abutment for the forward or small end of a conical coil spring 93, the rearward or large end of which abuttingly engages the flange 37 of the annular nut or retaining ring 35 which is provided with an upturned edge or rim portion 94 forming a shallow cup-shaped depression 95 into which the large or rearward end of the spring 93 fits. The modified mirror head 90 on the inside of its shell-like hollow casing 40 is provided with a roughened surface portion including radial ridges 96 and indentations 96a preferably arranged in an annular path or zone and engaged by the pointed ends or tips 97, 98 and 99 of the arms or blades 100, 101 and 102 respectively. The arms or blades 100, 101 and 102 correspond in other respects to the blades 71, 77 and 78 of Figures 1 and 2 and are similarly formed of spring material, such as spring steel.

The radial leaf spring 105 shown in Figures 11 and 12, is adapted to be substituted for the conical coil spring 93 in the mirror head 90 of Figure 9. The spring 105 consists of the central hub portion 106 having a central hole 107 for the passage of the shaft extension 91 and having curved fingers 108 inclined approximately radially outward and rearward from the hub 100 (Figure 12). The outer end portions of the spring fingers 108 are bent as at 109 into arcuate shape in order to give a smooth sliding engagement with the flange 37 forming the bottom of the cup-shaped recess 95 into which the spring fingers 108 extend.

The operation of the modified mirror head 90 is generally similar to the operation of the mirror head 12 previously described and the foregoing description thereof broadly applies. The conical coil spring 93 or its substitute, the radial leaf spring 105, urge the shaft 49 outward, consequently urging the ball portion 25 against the surface 39 of the retaining nut 35 and increasing its frictional engagement therewith. The spring 93 or its substitute spring 105 tend to restore the mirror head 90 to its central position, but this tendency is resisted by the frictional engagement between the ball portion 25 and retaining nut 35. The spring thus tends to hold the shell 40 firmly against the ends of the spring blades or arms 100, 101 and 102 and to cause their pointed tips 97, 98 and 99 to remain in the indentations 96a between the radial ridges 96. When the spring blade 100 is forcibly swung by rotating the flexible wire 53 by means of the knob 61 (Figure 6), the pointed tip 97 thereof is moved over the ridges 96 and indentations 96a to its new position, carrying along with it the spring blades 101 and 102 in the manner previously described.

What I claim is:

1. A remotely-adjustable rear view mirror comprising a bracket adapted to be attached to a vehicle, a mirror support loosely and tiltably mounted on said bracket, a mirror mounted on said mirror support, a shaft rotatably mounted in said bracket, a driving arm drivingly mounted on said shaft adjacent said mirror support and having stops thereon, a pair of driven arms loosely mounted on said shaft on opposite sides of said driving arm and having contact portions disposed in the paths of travel of the stops of said driving arm and engageable thereby in response to the swinging of said driving arm upon rotation of said shaft, the outer portions of said driving and driven arms being engageable with said mirror support at locations remote from said shaft whereby to tilt said mirror support in response to the swinging of said driving arm, and mechanism extending from said shaft to a location remote therefrom for rotating said shaft.

2. A remotely-adjustable rear view mirror comprising a bracket adapted to be attached to a vehicle, a mirror support loosely and tiltably mounted on said bracket, a mirror mounted on said mirror support, a shaft rotatably mounted in said bracket, a driving arm drivingly mounted on said shaft adjacent said mirror support and having stops thereon, a pair of driven arms loosely mounted on said shaft on opposite sides of said driving arm and having contact portions disposed in the paths of travel of the stops of said driving arm and engageable thereby in response to the swinging of said driving arm upon rotation of said shaft, the outer portions of said driving and driven arms being engageable with said mirror support at locations remote from said shaft whereby to tilt said mirror support in response to the swinging of said driving arm, and mechanism extending from said shaft to a location remote therefrom for rotating said shaft, said contact portions of said driven arms comprising projections extending into the paths of said stops and engageable therewith.

3. A remotely-adjustable rear view mirror comprising a bracket adapted to be attached to a vehicle, a ball-and-socket joint mounted on said bracket and having a bore therethrough, a mirror support loosely and tiltably mounted on said ball-and-socket joint, a mirror mounted on said mirror support, a shaft rotatably mounted in said bracket and extending through said bore, a driving arm drivingly mounted on said shaft adjacent said mirror support and having stops thereon, a pair of driven arms loosely mounted on said shaft on opposite sides of said driving arm and having contact portions disposed in the paths of travel of the stops of said driving arm and engageable thereby in response to the swinging of said driving arm upon rotation of said shaft, the outer portions of said driving and driven arms being engageable with said mirror support at locations remote from said shaft whereby to tilt said mirror support in response to the swinging of said driving arm, and mechanism extending from said shaft to a location remote therefrom for rotating said shaft.

4. A remotely-adjustable rear view mirror comprising a bracket adapted to be attached to a vehicle, a hollow mirror casing loosely and tiltably mounted on said bracket, a mirror mounted on said casing, a shaft rotatably mounted in said bracket, a driving member drivingly mounted on said shaft and having stops thereon, said driving member and said shaft being rotatable relatively to said mirror support and mirror, driven members loosely mounted on said shaft and swingably engageable with the stops of said driving member, the outer portions of said driving and driven members being engageable with said mirror casing, and mechanism extending from said shaft to a location remote therefrom for rotating said shaft, said members comprising flexible arms engageable at their outer ends with the inner surface of said mirror casing.

5. A remotely-adjustable rear view mirror comprising a bracket adapted to be attached to a vehicle, a hollow mirror casing having an approximately spherical inner surface, said casing being loosely and tiltably mounted on said bracket, a mirror mounted on said casing, a shaft rotatably mounted in said bracket, a driving member drivingly mounted on said shaft and having stops thereon, said driving member and said shaft being rotatable relatively to said mirror support and mirror, driven members loosely mounted on said shaft and swingably engageable with the stops of said driving member, the outer portions of said driving and driven members being engageable with said mirror casing, and mechanism extending from said shaft to a location remote therefrom for rotating said shaft, said members being engageable at their outer ends with said spherical inner surface.

6. A remotely-adjustable rear view mirror comprising a bracket adapted to be attached to a vehicle, a ball-and-socket joint having the ball mounted on said bracket, a mirror support loosely and tiltably mounted on the socket of said ball-and-socket joint, a mirror mounted on said mirror support, a shaft rotatably mounted in said bracket, a driving member drivingly mounted on said shaft and having stops thereon, driven members loosely mounted on said shaft and swingably engageable with the stops of said driving member, the outer portions of said driving and driven members being engageable with said mirror support, mechanism extending from said shaft to a location remote therefrom for rotating said shaft, and a resilient member disposed between said shaft and said ball-and-socket joint, said resilient member being arranged to yieldingly urge said ball into said socket.

7. A remotely-adjustable rear view mirror comprising a bracket adapted to be attached to a vehicle, a ball-and-socket joint having the ball mounted on said bracket, a mirror support loosely and tiltably mounted on the socket of said ball-and-socket joint, a mirror mounted on said mirror support, a shaft rotatably mounted in said bracket, a driving member drivingly mounted on said shaft and having stops thereon, driven members loosely mounted on said shaft and swingably engageable with the stops of said driving member, the outer portions of said driving and driven members being engageable with said mirror support, mechanism extending from said shaft to a location remote therefrom for rotating said shaft, and a coil spring disposed between said shaft and said ball and socket joint, said coil spring being arranged to yieldingly urge said ball into said socket.

8. A remotely-adjustable rear view mirror comprising a bracket adapted to be attached to a vehicle, a ball-and-socket joint having the ball mounted on said bracket, a mirror support loosely and tiltably mounted on the socket of said ball-and-socket joint, a mirror mounted on said mirror support, a shaft rotatably mounted in said bracket, a driving member drivingly mounted on said shaft and having stops thereon, driven members loosely mounted on said shaft and swingably engageable with the stops of said driving member, the outer portions of said driving and driven members being engageable with said mirror support, mechanism extending from said shaft to a location remote therefrom for rotating said shaft, and a leaf spring disposed between said shaft and said ball-and-socket joint, said leaf spring being arranged to yieldingly urge said ball into said socket.

9. A remotely-adjustable rear view mirror comprising a bracket adapted to be attached to a vehicle, a ball-and-socket joint having the ball mounted on said bracket, a mirror support loosely and tiltably mounted on the socket of said ball-and-socket joint, a mirror mounted on said mirror support, a shaft rotatably mounted in said bracket, a driving member drivingly mounted on said shaft and having stops thereon, driven members loosely mounted on said shaft and swingably engageable with the stops of said driving member, the outer portions of said driving and driven members being engageable with said mirror support, mechanism extending from said shaft to a location remote therefrom for rotating said shaft, and a leaf spring disposed between said shaft and said ball-and-socket joint, said leaf spring having resilient fingers arranged to yieldingly urge said ball into said socket.

10. A remotely-adjustable rear view mirror comprising a bracket adapted to be attached to a vehicle, a hollow mirror casing loosely and tiltably mounted on said bracket, a mirror mounted on said casing, a shaft rotatably mounted in said bracket, a driving member drivingly mounted on said shaft and having stops thereon, driven members losely mounted on said shaft and swingably engageable with the stops of said driving member, the outer portions of said driving and driven members being engageable with said mirror casing, and mechanism extending from said shaft to a location remote therefrom for rotating said shaft, said casing having a roughened surface portion on the inner side thereof in the path of the ends of said driving and driven members.

11. A remotely-adjustable rear view mirror comprising a bracket adapted to be attached to a vehicle, a hollow mirror casing loosely and tiltably mounted on said bracket, a mirror mounted on said casing, a shaft rotatably mounted in said bracket, a driving member drivingly mounted on said shaft and having stops thereon, driven members loosely mounted on said shaft and swingably engageable with the stops of said driving member, the outer portions of said driving and driven members being engageable with said mirror casing, and mechanism extending from said shaft to a location remote therefrom for rotating said shaft, said members comprising flexible arms engageable at their outer ends with the inner surface of said mirror casing, said casing having a roughened surface portion on the inner side thereof in the path of the ends of said arms.

12. A remotely-adjustable rear view mirror comprising a bracket adapted to be attached to a vehicle, a hollow mirror casing loosely and tiltably mounted on said bracket, a mirror mounted on said casing, a shaft rotatably mounted in said bracket, a driving member drivingly mounted on said shaft and having stops thereon, driven members loosely mounted on said shaft and swingably engageable with the stops of said driving member, the outer portions of said driving and driven members being engageable with said mirror casing, and mechanism extending from said shaft to a location remote therefrom for rotating said shaft, said members comprising flexible arms engageable at their outer ends with the inner surface of said mirror casing, said casing having a roughened surface portion on the inner side thereof in the path of the ends of said arms, the ends of said flexible arms having projections engaging said roughened surface portion.

RICHARD L. HIGGINS.

References Cited in the file of this patent

UNITED STATES PATENTS

| Number | Name | Date |
|---|---|---|
| 1,672,900 | Nichols | June 12, 1928 |
| 2,089,463 | Ritz-Woller | Aug. 10, 1937 |
| 2,260,597 | Beattie | Oct. 28, 1941 |
| 2,281,234 | Clark et al. | Apr. 28, 1942 |
| 2,315,260 | Lancaster | Mar. 30, 1943 |
| 2,326,316 | Allen | Aug. 10, 1943 |
| 2,330,444 | Park | Sept. 28, 1943 |
| 2,338,780 | Poncher et al. | Jan. 11, 1944 |
| 2,341,208 | Clark et al. | Feb. 8, 1944 |
| 2,456,362 | Aves | Dec. 14, 1948 |